(12) United States Patent
Sundberg et al.

(10) Patent No.: US 7,166,823 B2
(45) Date of Patent: Jan. 23, 2007

(54) METHOD OF MAKING A HEATING ELEMENT OF MOLYBDENUM SILICIDE TYPE AND A HEATING ELEMENT

(75) Inventors: Mats Sundberg, Västerås (SE); Hans Pettersson, Hallstahammar (SE)

(73) Assignee: Sandvik Intellectual Property Aktiebolag, Sandviken (SE)

( * ) Notice: Subject to any disclaimer, the term of this patent is extended or adjusted under 35 U.S.C. 154(b) by 11 days.

(21) Appl. No.: 10/510,146

(22) PCT Filed: Mar. 6, 2003

(86) PCT No.: PCT/SE03/00380

§ 371 (c)(1),
(2), (4) Date: Jul. 11, 2005

(87) PCT Pub. No.: WO03/087015

PCT Pub. Date: Oct. 23, 2003

(65) Prior Publication Data

US 2005/0242083 A1   Nov. 3, 2005

(30) Foreign Application Priority Data

Apr. 5, 2002   (SE) .................. 0201043-7

(51) Int. Cl.
*H05B 3/10*   (2006.01)
*H05B 3/00*   (2006.01)

(52) U.S. Cl. ........................................ 219/553; 29/611

(58) Field of Classification Search ................ 219/553, 219/552, 538, 354, 548, 349; 29/611
See application file for complete search history.

(56) References Cited

U.S. PATENT DOCUMENTS

| | | | | |
|---|---|---|---|---|
| 4,912,305 A | * | 3/1990 | Tatematsu et al. ............ 219/544 |
| 5,708,408 A | | 1/1998 | Sundberg ..................... 338/306 |
| 5,908,799 A | * | 6/1999 | Kobayashi et al. ......... 501/98.4 |
| 5,965,051 A | * | 10/1999 | Hirayama et al. ........... 219/553 |
| 6,482,759 B1 | | 11/2002 | Sundberg et al. ........... 501/96.3 |
| 6,562,095 B1 | | 5/2003 | Sundberg ..................... 219/553 |
| 6,563,095 B1 | * | 5/2003 | Sundberg ..................... 219/553 |
| 6,707,016 B2 | | 3/2004 | Sundberg ..................... 219/548 |
| 2004/0056021 A1 | | 3/2004 | Sundberg ..................... 219/548 |
| 2004/0094535 A1 | | 5/2004 | Sundberg ..................... 219/548 |
| 2004/0156772 A1 | | 8/2004 | Sundberg et al. ............ 423/324 |

FOREIGN PATENT DOCUMENTS

| | | |
|---|---|---|
| GB | 731616 | 6/1955 |
| GB | 751294 | 6/1956 |
| WO | WO 95/31417 | 11/1995 |

* cited by examiner

*Primary Examiner*—Daniel Robinson
(74) *Attorney, Agent, or Firm*—Alfred J. Mangels

(57) ABSTRACT

A method for the production of a heating element that is composed essentially of molybdenum silicide and alloys of that basic material, and a heating element formed from such material. A material is produced that contains substantially $Mo(Si_{1-x}Al_x)_2$ and $Al_2O_3$ by mixing a molybdenum aluminum silicide $Mo(Si_{1-y}Al_y)_2$ with bentonite clay in a known manner. The bentonite clay contains impure or contaminating substances with which molybdenum silicide cannot be alloyed and with which the symmetry of the crystal lattice of the molybdenum silicide is retained with a combined content of less than 2000 ppm.

12 Claims, No Drawings

METHOD OF MAKING A HEATING ELEMENT OF MOLYBDENUM SILICIDE TYPE AND A HEATING ELEMENT

BACKGROUND OF THE INVENTION

1. Field of the Invention

The present invention relates to a method of manufacturing a heating element of the molybdenum silicide type and also to a heating element.

2. Description of the Related Art

An electric resistance element of the molybdenum silicide type is described in Swedish Patent Specifications 0003512-1 and 0004329-9. According to patent specification 0003512-1 the resistance material of the heating element includes $Mo(Si_{1-x}Al_x)_2$ which contains aluminum to an extent at which the formation of pest is essentially prevented.

It has been found that when such material is operated in a temperature range of 400–600° C. no pest, or only a slight amount of pest, is formed. Pest is formed by virtue of the formation of $MoO_3$ from $MoSi_2$ and $O_2$.

The reason why the formation of pest is significantly reduced or is eliminated is due the formation of $Al_2O_3$ on the surface of the element.

According to one preferred embodiment x is caused to lie in the range of 0.2–0.6.

The other patent specification, 0004329-9, teaches a method of increasing the useful life span of heating elements that consist chiefly of molybdenum silicide and alloys of that basic material where the element operates at high temperatures.

According to that patent specification, the heating element contains aluminum to an extent which is sufficient to maintain a stable, slowly growing layer of aluminum oxide on the surface of the heating element.

According to a preferred embodiment the heating element material contains $Mo(Si_{1-x}Al_x)_2$, where x lies in the range of 0.2–0.6.

A material of the molybdenum silicide type that contains aluminum has been found to possess improved corrosion properties at both low and high temperatures.

Such material is often produced by mixing $MoSi_2$ powder with oxidic raw material, such as aluminosilicates. When the raw material is bentonite clay, there is obtained a relatively low melting point which contributes towards so-called smelt phase sintering, which results in dense materials that contain $MoSi_2$ and a proportion of aluminum silicate corresponding to 15–20 percent by volume.

Bentonite clay has different compositions. Some bentonites include 60% by weight $SiO_2$ while some contain somewhat more than 70% by weight $SiO_2$. Although the $Al_2O_3$ content varies, it normally lies between 13–20% by weight. The melting point varies between about 1200–1400° C.

Bentonite clay that contains chiefly $SiO_2$ can be used in the production of heating elements containing $Mo(Si_{1-x}Al_x)_2$. When sintering with an Al-alloyed silicide there takes place a chemical exchange reaction in which the greater affinity of the oxygen to Al than to Si results in Si leaving the aluminum silicate and entering the silicide as a result of Al leaving the silicide and being taken up by the oxide phase. That exchange reaction also contributes towards improved sintering properties of the composite material. The final material contains $Mo(Si_{1-x}Al_x)_2$ that is substantially depleted of Al, where the oxide phase contains $Al_2O_3$ in all essentials.

The standard procedure of manufacture involves mixing molybdenum, silicon, and aluminum in powder form and firing the powder mix normally under a shielding gas atmosphere. This results in a cake of the material $Mo(Si_{1-y}Al_y)_2$, where y is larger than x as a result of said exchange reaction. The reaction is exothermic. The cake is then crushed and ground down to a fine particle size normally in the order of 1–20 µm. The resulting powder is mixed with bentonite clay to form a wet ceramic material. The material is extruded and dried to a rod form whose diameter corresponds to the diameter of the subsequent heating element. The material is then sintered at a temperature that exceeds the melting temperature of the included components.

However, there is a drawback with an element of that kind. The problem is that the oxide that forms on the surface of the element, namely $Al_2O_3$, sometimes peels away or flakes off, i.e., loosens from the surface of the element, in cyclic operation.

A peeling oxide gives poorer protection against continued oxidation of aluminum, which becomes impoverished in the outer surface of the element more quickly. Moreover, peeling oxide can contaminate the oven in which the element is fitted, with the risk that performance and the appearance of products heat treated in ovens that have such elements will be significantly impaired. This restricts the use of such elements in heating processes.

This problem is solved by the present invention.

SUMMARY OF THE INVENTION

The present invention thus relates to a method of producing a heating element that is composed substantially of material of the molybdenum silicide type and alloys of that basic material. A material is produced that contains chiefly $Mo(Si_{1-x}Al_x)_2$ and $Al_2O_3$ by mixing molybdenum aluminosilicide $(Mo(Si_{1-y}Al_y)_2)$ with bentonite clay in a way known per se. The bentonite clay includes impurities with which the molybdenum silicide cannot be alloyed and with which the symmetry of the crystal lattice of the molybdenum silicide will be retained, with a combined content of 2000 ppm.

The present invention also relates to a heating element that is substantially of the molybdenum silicide type and alloys of that basic material, wherein the element is composed chiefly of the materials $Mo(Si_{1-x}Al_x)_2$ and $Al_2O_3$, and wherein the material contains impure substances with which the molybdenum suicide can not be alloyed and with which the symmetry of the crystal lattice of the molybdenum silicide is maintained with a combined content of less than 2000 ppm.

The invention will be described in more detail in the following description.

DESCRIPTION OF THE PREFERRED EMBODIMENTS

In accordance with the invention, a heating element that is composed chiefly of molybdenum silicide type material and alloys of that basic material is produced in principle by the method described above. There is thus produced a powder that contains essentially $Mo(Si_{1-y}Al_y)_2$ and that is mixed with bentonite clay that contains $Al_2O_3$.

According to the invention, the bentonite clay includes impurities with which the molybdenum silicide cannot be alloyed, so that the symmetry of the crystal lattice will be retained, with a combined content of less than 2000 ppm. Bentonite clay that has those low impurity contents can be produced by purifying the bentonite clay with the aid of known chemical cleaning processes.

In distinction to that approach, it is possible to partly substitute for molybdenum Re or W in the material $Mo(Si_{1-x}Al_x)_2$ without changing the symmetry of the crystal lattice.

According to one preferred embodiment of the invention, the combined content of the impurity substances Mg, Ca, Fe, Na, and K is below 2000 ppm.

According to another preferred embodiment of the invention, the content of said impure substances is below 1000 ppm.

It has been found, surprisingly, that there is obtained at such low contaminant contents an oxide which does not peel after cyclic operation between room temperature and high temperatures, for instance 1500° C.

According to one embodiment x lies in the range of 0.4–0.6.

According to one preferred embodiment x lies in the range of 0.45–0.55.

The present invention thus solves the problem mentioned in the introduction and enables the present heating element to be used beneficially in ovens without detriment to the material treated in the oven.

The present invention shall not be considered to be limited to the above-described embodiments since variations can be made within the scope of the accompanying claims.

What is claimed is:

1. A method of producing a heating element that is composed essentially of molybdenum silicide type material and alloys of that basic material, said method comprising the steps of: producing a heating element material that contains substantially $Mo(Si_{1-x}Al_x)_2$ and $Al_2O_3$ by mixing a molybdenum aluminium silicide $Mo(Si_{1-y}Al_y)_2$ with bentonite clay in a known manner, wherein the bentonite clay contains impure substances with which molybdenum silicide cannot be alloyed and with which the symmetry of the crystal lattice of the molybdenum silicide is retained at a combined impure substance content of less than 2000 ppm; and forming a heating element from the heating element material.

2. A method according to claim 1, wherein the impure substances include at least one of Mg, Ca, Fe, Na, and K, and the combined content of the impure substances is less than 2000 ppm.

3. A method according to claim 2, wherein the content of said impure substances is less than 1000 ppm.

4. A method according to claim 1, wherein x lies in the range of 0.4–0.6.

5. A method according to claim 1, wherein x lies in the range of 0.45–0.55.

6. A method according to claim 1, including the step of substituting molybdenum partly with at least one of Re and W in the material $Mo(Si_{1-x}Al_x)_2$.

7. An electrical heating element composition that is composed substantially of molybdenum silicide type material and alloys of that basic material, said element comprising the materials $Mo(Si_{1-x}Al_x)_2$ and $Al_2O_3$; wherein the heating element material contains impure substances with which the molybdenum silicide can not be alloyed and with which the symmetry of the crystal lattice of the molybdenum suicide is maintained, wherein the impure substances are present at a combined content of less than 2000 ppm.

8. A heating element composition according to claim 7, wherein the impure substances include Mg, Ca, Fe, Na, and K and the combined content of the impure substances is less than 2000 ppm.

9. A heating element composition according to claim 8, wherein the impure substance content of said material is less than 1000 ppm.

10. A heating element composition according to claim 7, wherein x lies in the range of 0.4–0.6.

11. A heating element composition according to claim 7, wherein x lies in the range of 0.45–0.55.

12. A heating element composition according to claim 7, wherein molybdenum in the material $Mo(Si_{1-x}Al_x)_2$ is replaced partially with at least one of Re and W.

* * * * *